(12) United States Patent
Pun et al.

(10) Patent No.: US 7,769,084 B1
(45) Date of Patent: Aug. 3, 2010

(54) METHOD FOR IMPLEMENTING A QUANTIZER IN A MULTIMEDIA COMPRESSION AND ENCODING SYSTEM

(75) Inventors: Thomas Pun, Sunnyvale, CA (US); Roger Kumar, San Francisco, CA (US); Xiaochun Nie, Cupertino, CA (US); Hsi-Jung Wu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1949 days.

(21) Appl. No.: 10/427,843

(22) Filed: Apr. 30, 2003

Related U.S. Application Data

(60) Provisional application No. 60/395,971, filed on Jul. 15, 2002.

(51) Int. Cl.
*H04N 7/18* (2006.01)

(52) U.S. Cl. .......................... 375/240.03; 375/240.04; 375/240.05

(58) Field of Classification Search ................................ 375/240.01–240.29
See application file for complete search history.

(56) References Cited

U.S. PATENT DOCUMENTS

| | | | |
|---|---|---|---|
| 5,164,828 A | 11/1992 | Tahara et al. | |
| 5,231,484 A | 7/1993 | Gonzales et al. | |
| 5,241,383 A | 8/1993 | Chen et al. | |
| 5,333,012 A | 7/1994 | Singhal et al. | |
| 5,469,208 A | 11/1995 | Dea | |
| 5,623,308 A * | 4/1997 | Civanlar et al. | 375/240.01 |
| 5,650,860 A * | 7/1997 | Uz | 382/253 |
| 5,654,760 A | 8/1997 | Ohtsuki | |
| 5,726,711 A * | 3/1998 | Boyce | 348/408.1 |
| 5,790,196 A | 8/1998 | Sun et al. | |
| 5,847,766 A * | 12/1998 | Peak | 375/240.24 |
| 5,872,598 A | 2/1999 | Legall et al. | |

(Continued)

FOREIGN PATENT DOCUMENTS

EP 1091588 4/2001

OTHER PUBLICATIONS

U.S. Appl. No. 10/427,669, filed Apr. 30, 2003, Xiaochun Nie, et al.

(Continued)

*Primary Examiner*—Andy S Rao
(74) *Attorney, Agent, or Firm*—Adeli & Tollen LLP

(57) ABSTRACT

Method For Implementing A Quantizer In A Multimedia Compression And Encoding System is disclosed. In the Quantizer system of the present invention, several new quantization ideas are disclosed. In one embodiment, adjacent macroblocks are grouped together into macroblock groups. The macroblock groups are then assigned a common quantizer value. The common quantizer value may be selected based upon how the macroblocks are encoded, the type of macroblocks within the macroblock group (intra-blocks or inter-blocks), the history of the motion vectors associated with the macroblocks in the macroblock group, the residuals of the macroblocks in the macroblock group, and the energy of the macroblocks in the macroblock group. The quantizer value may be adjusted in a manner that is dependent on the current quantizer value. Specifically, if the quantizer value is at the low end of the quantizer scale, then only small adjustments are made. If the quantizer value is at the high end then larger adjustments may be made to the quantizer. Finally, in one embodiment, the quantizer is implemented along with an inverse quantizer for efficient operation.

52 Claims, 6 Drawing Sheets

U.S. PATENT DOCUMENTS

| | | | |
|---|---|---|---|
| 5,929,914 A * | 7/1999 | Normand | 375/240.04 |
| 5,937,138 A | 8/1999 | Fukuda et al. | |
| 5,986,712 A * | 11/1999 | Peterson et al. | 375/240.14 |
| 5,990,958 A | 11/1999 | Bheda et al. | |
| 6,014,181 A * | 1/2000 | Sun | 348/699 |
| 6,125,147 A | 9/2000 | Florencio et al. | |
| 6,134,663 A * | 10/2000 | Nakamura et al. | 726/26 |
| 6,141,448 A * | 10/2000 | Khansari et al. | 382/236 |
| 6,160,846 A | 12/2000 | Chiang et al. | |
| 6,167,085 A | 12/2000 | Saunders et al. | |
| 6,263,020 B1 | 7/2001 | Gardos et al. | |
| 6,310,897 B1 * | 10/2001 | Watanabe et al. | 370/522 |
| 6,324,217 B1 | 11/2001 | Gordon | |
| 6,480,539 B1 | 11/2002 | Ramaswamy | |
| 6,510,176 B1 | 1/2003 | Fukuda et al. | |
| 6,639,942 B1 * | 10/2003 | Bayazit | 375/240.01 |
| 6,694,060 B2 | 2/2004 | Liu et al. | |
| 6,763,067 B2 | 7/2004 | Hurst | |
| 6,831,947 B2 | 12/2004 | Ribas Corbera | |
| 6,944,221 B1 | 9/2005 | Keesman | |
| 6,963,608 B1 | 11/2005 | Wu | |
| 7,079,581 B2 | 7/2006 | Noh et al. | |
| 7,103,099 B1 | 9/2006 | Paz et al. | |
| 7,418,037 B1 | 8/2008 | Nie et al. | |
| 2001/0000704 A1 | 5/2001 | Fert et al. | |
| 2002/0085636 A1 | 7/2002 | Uenoyama et al. | |
| 2002/0094082 A1 | 7/2002 | Jones et al. | |
| 2002/0163964 A1 | 11/2002 | Nichols | |
| 2003/0142751 A1 | 7/2003 | Hannuksela | |
| 2005/0286631 A1 | 12/2005 | Wu et al. | |
| 2006/0013298 A1 | 1/2006 | Tong et al. | |
| 2009/0010325 A1 | 1/2009 | Nie et al. | |

OTHER PUBLICATIONS

U.S. Appl. No. 10/716,265, filed Nov. 17, 2003, Thomas Pun, et al.
U.S. Appl. No. 10/716,316, filed Nov. 17, 2003, Xiaochun Nie, et al.
Non-Final Office Action U.S. Appl. No. 10/427,669, filed Apr. 30, 2003, Xiaochun Nie, et al.
Final Office Action U.S. Appl. No. 10/427,669, filed Apr. 30, 2003, Xiaochun Nie, et al.
Non-Final Office Action U.S. Appl. No. 10/427,669, filed Apr. 30, 2003, Xiaochun Nie, et al.
Non-Final Office Action U.S. Appl. No. 10/716,316, filed Nov. 17, 2003, Xiaochun Nie, et al.
Non-Final Office Action U.S. Appl. No. 10/716,265, filed Nov. 17, 2003, Thomas Pun, et al.
Chow, K. W. and Liu, B. "Complexity based rate control for MPEG encoder". _Proceedings of the 1994 IEEE International Conference on Image Processing_(ICIP-94), vol. 1, pp. 263-267.
Lee, L. W. et al. "On the Error Distribution and Scene Change for the Bit Rate Control of MPEG". _IEEE Transactions on Consumer Electronics_, vol. 39, Issue 3 (Jun. 11, 1993), pp. 545-554.
Teixeira, L. and Ribeiro, H. "Analysis of a Two Step MPEG Video System". _Proceedings of the 1997 IEEE International Conference on Image Processing_, vol. 1, pp. 350-352.
Notice of Allowance of U.S. Appl. No. 10/427,669, mailed Nov. 27, 2007, Xiaochun Nie, et al.,
Supplemental Notice of Allowance of U.S. Appl. No. 10/427,669, mailed Jan. 22, 2008, Xiaochun Nie, et al.
Notice of Allowance of U.S. Appl. No. 10/427,669, mailed Mar. 17, 2008, Xiaochun Nie, et al.
Final Office Action of U.S. Appl. No. 10/716,265, mailed Oct. 12, 2007, Thomas Pun, et al.
Advisory Action of U.S. Appl. No. 10/716,265, mailed Jan. 16, 2008, Thomas Pun, et al.
Final Office Action of U.S. Appl. No. 10/716,316, mailed Jan. 11, 2008, Xiaochun Nie, et al.
Advisory Action of U.S. Appl. No. 10/716,316, mailed Apr. 8, 2008, Xiaochun Nie, et al.
Non-Final Office Action of U.S. Appl. No. 10/716,316, mailed Sep. 12, 2008, Xiaochun Nie, et al.
IEEE 100: The Authoritative Dictionary of IEEE Standards Terms, $7^{th}$ ed. New York: IEEE, Dec. 2000.

* cited by examiner

Figure 2a

| 0 | 1 | 2 | 3 | 4 | 5 | 6 | 7 | 8 | 9 |
|---|---|---|---|---|---|---|---|---|---|
| 10 | 11 | 12 | 13 | 14 | 15 | 16 | 17 | 18 | 19 |
| | | | | | | | | | |
| | | | | | | | | | |
| | | | | | | | | | |
| | | | | | | | | | |
| | | | | | | | | | |

Figure 2b

Macroblock Group Number

| | $S_0$ | $S_1$ | $S_2$ | $S_3$ | $S_4$ | $S_5$ | $S_6$ | $S_7$ | $S_8$ | $S_9$ |
|---|---|---|---|---|---|---|---|---|---|---|
| 0 | | | | | | | | | | |
| 1 | $S_{10}$ | $S_{11}$ | $S_{12}$ | $S_{13}$ | $S_{14}$ | $S_{15}$ | $S_{16}$ | $S_{17}$ | $S_{18}$ | $S_{19}$ |
| 2 | | | | | | | | | | |
| 3 | | | | | | | | | | |
| 4 | | | | | | | | | | |
| 5 | | | | | | | | | | |
| 6 | | | | | | | | | | |

$$m_0 = \frac{1}{10}\sum_{i=0}^{9} s_i$$

$$m_1 = \frac{1}{10}\sum_{i=10}^{19} s_i$$

$$m_{AVG} = \frac{1}{7}\sum_{i=0}^{6} m_i$$

| 0 | 1 | 2 | 3 | 4 | 5 | 6 | 7 | 8 | 9 |
|---|---|---|---|---|---|---|---|---|---|
| 10 | 11 | 12 | 13 | 14 | 15 | 16 | 17 | 18 | 19 |
|  |  |  |  |  |  |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |

METHOD FOR IMPLEMENTING A QUANTIZER IN A MULTIMEDIA COMPRESSION AND ENCODING SYSTEM

RELATED APPLICATIONS

This application claims the benefit under title 35, United States Code, Section 119(e) of the U.S. provisional application having Ser. No. 60/395,971 that was filed on Jul. 15, 2002.

FIELD OF THE INVENTION

The present invention relates to the field of multimedia compression systems. In particular the present invention discloses methods and systems for implementing a quantizer that efficiently selects a quantizer value for each macroblock that will obtain a high compression ratio without sacrificing video image quality.

BACKGROUND OF THE INVENTION

Digital based electronic media formats are finally on the cusp of largely replacing all of the older analog electronic media formats. In the audio media arena, digital compact discs (CDs) replaced analog vinyl records long ago. Analog magnetic cassette tapes are becoming increasingly rare and will eventually share the same fate of 8-track tapes. Second and third generation digital audio systems such as digital Mini-discs and MP3 (MPEG Audio-layer 3) files are now taking market share away from the first generation digital audio format of compact discs.

The video media has been slower to move from analog storage and transmission formats to digital storage and transmission formats than audio. The reason for this slower analog to digital transition is largely due to the massive amounts of digital information required to accurately represent video images in digital form. The massive amounts of information require very high-capacity digital storage systems with high bit-rate outputs and high-bandwidth transmission systems. Furthermore, cost of switching from analog video equipment to digital video equipment is significantly higher than the cost of switching from analog audio equipment to digital audio equipment.

However, video is now finally rapidly moving from analog storage (VHS and Beta) and analog transmission formats (NTSC and PAL) to digital storage (MPEG) and digital transmission formats (ATSC). The DVD (Digital Versatile Disc), a digital video system, has been one of the fastest selling consumer electronic products in years. DVDs have been rapidly supplanting VHS and Beta Video-Cassette Recorders (VCRs) as the pre-recorded video playback system of choice due their high video quality, very high audio quality, convenience, and extra features. A new generation of intelligent Personal Video Records (PVRs) such as TiVo and Replay have emerged that take advantage of digital video technology. The antiquated analog NTSC (National Television Standards Committee) video transmission system is now being replaced with the digital ATSC (Advanced Television Standards Committee) video transmission system that provides for 5.1 channels of CD-quality digital audio and beautiful high-definition television (HDTV) images.

Computer systems have been using various different digital video storage and transmission formats for a number of years. Among the best digital video compression and encoding systems used by computer systems have been the series of digital video encoding systems backed by the Motion Pictures Expert Group, better known as MPEG. The three most well known and widely used digital video encoding systems from MPEG are known simply as MPEG-1, MPEG-2, and MPEG-4. VideoCDs and consumer-grade digital video editing systems use the MPEG-1 format. Digital Versatile Discs (DVDs), the Dish Network brand direct broadcast satellite (DBS) television system, and the new terrestrial digital transmission system known as ATSC use the MPEG-2 digital video compression and encoding system. MPEG-4 system was originally developed for small mobile devices. However technology from the MPEG-4 system is rapidly being adapted by new computer based digital video encoders and digital video players.

The MPEG-2 and MPEG-4 standards compress a series of video frames and encode the compressed frames into a digital bit stream. When encoding a video frame with the MPEG-2 and MPEG-4 systems, the video frame is divided into a rectangular grid of macroblocks. Each macroblock in the video frame is independently compressed and encoded.

When compressing the macroblocks from a video frame, an MPEG-2 or MPEG-4 encoder uses a quantizer that selects a quantizer value (q) that is used to quantize individual numeric values in the macroblock. The smaller the quantizer value (q), the more bits will be used to encoded the macroblock. In order to efficiently compress macroblocks from a video frame, the quantizer in a digital video encoding system must be able to select an appropriate a quantizer value (q) that maximizes the compression while ensuring a high quality compressed video frame.

SUMMARY OF THE INVENTION

Method For Implementing A Quantizer In A Multimedia Compression And Encoding System is disclosed. In the Quantizer system of the present invention, several new quantization ideas are disclosed. In one embodiment, macroblocks are grouped together into macroblock groups. The macroblock groups are then assigned a common quantizer value. The common quantizer value may be selected based upon how the macroblocks are encoded, the type of macroblocks within the macroblock group (intra-blocks or inter-blocks), the history of the motion vectors associated with the macroblocks in the macroblock group, the residuals of the macroblocks in the macroblock group, and the energy of the macroblocks in the macroblock group. The quantizer value may be adjusted in a manner that is dependent on the current quantizer value. Specifically, if the quantizer value is at the low end of the quantizer scale, then only small adjustments are made. If the quantizer value is at the high end then larger adjustments may be made to the quantizer. Finally, in one embodiment, the quantizer is implemented along with an inverse quantizer for efficient operation.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which:

FIG. 2a illustrates a video frame that has been divided into a matrix of macroblocks.

FIG. 2b illustrates the video frame of FIG. 2a wherein all the macroblocks from the same row have been placed into a macroblock group.

FIG. 2c illustrates the video frame of FIG. 2a wherein all the macroblocks have been divided into macroblock groups containing two macroblocks in each macroblock group.

DETAILED DESCRIPTION OF THE PREFERRED EMBODIMENT

A method and system for performing rate control in a multi-media compression and encoding system is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the MPEG-4 multimedia compression and encoding system. However, the same techniques can easily be applied to other types of compression and encoding systems.

Multimedia Compression and Encoding Overview

Figure 1:
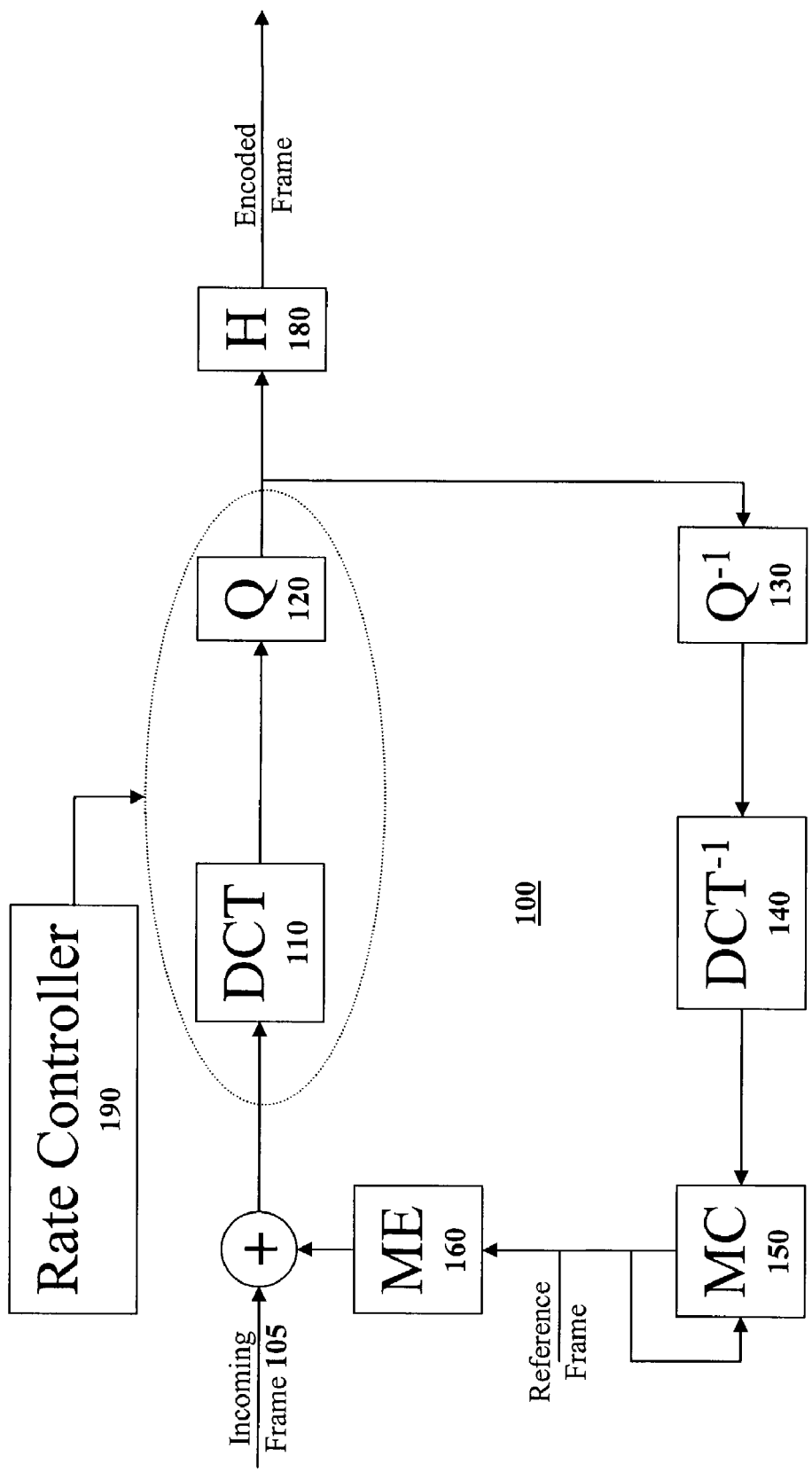
FIG. 1 illustrates a block diagram of a digital video encoder.

FIG. 1 illustrates a high-level block diagram of a typical digital video encoder 100 as is well known in the art of digital video. The digital video encoder 100 receives incoming stream of video frames 105 at the left of the block diagram. Each incoming video frame is processed by a Discrete Cosine Transformation (DCT) unit 110. The frame may be processed independently (an intra-frame) or with reference to information from other frames received from the motion compensation unit 150 (an inter-frame).

Next, a Quantizer (Q) unit 120 quantizes the digital video information from the Discrete Cosine Transformation unit 110. Finally, the quantized frame information is then encoded with an entropy encoder (H) unit 180 to produce a final encoded bit stream.

Since an inter-frame encoded video frame is defined with reference to other nearby video frames, the digital video encoder 100 needs to create a copy of how each digital video frame will appear within a digital video decoder such that inter-frames may be encoded. Thus the lower portion of the digital video encoder 100 is essentially the same as a digital video decoder unit. Specifically, an Inverse quantizer ($Q^{-1}$) 130 first reverses the quantization of the frame information. Next, an inverse Discrete Cosine. Transformation ($DCT^{-1}$) unit 140 reverses the Discrete Cosine Transformation of the frame information. After all the DCT coefficients are reconstructed from iDCT, the motion compensation unit will use the information, along with the motion vectors, to reconstruct the video frame. The reconstructed video frame may then be used as a reference frame for the motion estimation of other video frames.

The reconstructed video frame may then be used to encode inter-frames that are defined relative to information in the reconstructed video frame. Specifically, a motion compensation (MC) unit 150 and a motion estimation (ME) unit 160 are used to determine motion vectors and generate differential values used to encode inter-frames based upon the reconstructed video frame.

A rate controller 190 in a digital video encoder 100 receives information from many different components of the digital video encoder 100. The rate controller 190 uses the information to allocate a bit budget for each video frame to be encoded. The bit budget should be allocated in a manner that will generate the highest quality digital video bit stream that that complies with a specified set of restrictions. Specifically, the rate controller 190 attempts generate the highest quality compressed video stream without overflowing buffers of a digital video decoding unit (exceeding the amount of available memory by sending more information than can be stored) or underflowing buffers (not sending frames fast enough such that the digital video decoding unit runs out of video frames to display).

Macroblocks and Quantization

In MPEG-2 and MPEG-4 video encoding systems, the video frame is divided into a rectangular grid of 'macroblocks' wherein each macroblock represents a small rectangular area of the video frame. FIG. 2a illustrates a video frame that has been divided into a matrix of macroblocks. In an MPEG-4 video encoding systems, the macroblocks each contain a 16×16 matrix of pixels. The macroblocks in FIG. 2a are sequentially numbered starting from the upper left corner and scanning across horizontally and then down to the next sequential row.

As set forth in the previous section, the macroblocks in a MPEG-4 system are first processed by a Discrete Cosine Transform (DCT) unit 110. Next, the results from the Discrete Cosine Transform (DCT) unit 110 are then quantized by a Quantizer unit 120 to reduce the amount of information needed to represent the macroblock. The Quantizer unit 120 selects a quantizer value (q) that will be used to quantize a particular macroblock.

In some digital video encoding systems, the quantizer value (q) used for a particular macroblock can only change a very limited amount from the quantizer value (q) used by the previous adjacent macroblock. Specifically, in MPEG-4, the quantizer value (q) for a macroblock can only change from the quantizer value (q) of the immediate preceding macroblock by a difference in the range of −2, −1, 0, +1, or +2.

Quantization for Macroblock Groups

In one embodiment of the present invention, the quantizer arranges the macroblocks into groups to use a single group quantizer. Specifically, all the macroblocks within the same 'macroblock group' are encoded with the same quantizer value (q). In this mariner, the quantizer value does not vary so quickly across the image. Instead, the macroblock grouping will cause a more steady change across the image. If the macroblocks were not grouped, then a significant quality change might not be seen since the quantizer value may instead react incorrectly to local phenomenon.

In digital video encoding schemes such as MPEG-4, the quantizer values are only allowed to change by small amounts between adjacent macroblocks. Thus, for such digital video encoders it is important to correctly group the macroblocks to allow the quantizer values to step up or step down to the desired quantizer values.

FIG. 2b illustrates the video frame of FIG. 2a wherein all the macroblocks from the same macroblock row have been placed into a macroblock group. Each macroblock row group has been given a number from 0 to 6 as illustrated in FIG. 2b. In one embodiment, all of the macroblocks in the macroblock group are given the same quantizer value.

Macroblock Group Quantizer Assignment Using Mean Residual/SAD

One method of selecting a quantizer value for an individual macroblock is to examine information from the Motion Estimator unit 160. Specifically, a residual that can be measured as a sum of absolute differences (SAD) value for the macroblock calculated by the Motion Estimator unit 160 may be used to select a quantizer value (q). For example, macroblocks with large SAD values (a complex macroblock with a large residual) will receive a finer quantizer value that does not compress the macroblock excessively. Similarly, macroblocks having a small SAD value (a simple macroblock) receive a coarser quantizer value (q) to efficiently compress such simple macroblocks. To select a quantizer value (q) for a group of macroblocks, the SAD values are averaged together to provide a mean sum of absolute differences referred to as $m_g$ (where g specifies the macroblock group number 0 to 6). As illustrated in FIG. 2b, the mean sum of absolute difference value for the first row grouping of macroblocks ($m_0$) is calculated by averaging the SAD values $s_0$ to $s_9$ for that row with the $$\text{formula } m_0 = \frac{1}{9} \sum_{i=0}^{9} s_i.$$

Macroblock Group Quantizer Assignment Using Mean Macroblock Energy

Another method of selecting a quantizer value for an individual macroblock is to examine the energy information for the macroblock. The 'energy' of a macroblock is a measure of the frequency of the data. A macroblock with high frequency data (thus high 'energy' data) should be allocated more bits by assigning a coarse quantization value. The energy measure may be viewed as an estimate of how much quantization noise a particular macroblock holds. Thus a high energy macroblock is determined to have an ability to hold quantization noise such that a coarse quantizer value should be used. Conversely, a macroblock with low energy and thus less ability to hold quantization noise should be given a finer quantizer value. To select a quantizer value (q) for a group of macroblocks, the energy values for the macroblocks may be averaged together to provide a mean energy value. The mean energy value may then be used to select a quantization value for the macroblock group.

Macroblock Group Quantizer Assignment Quantizer Categories

In another implementation, the various different macroblock groups may be assigned into limited number of different quantization categories. To generate a set of quantization categories, one of the macroblock group measurements may be used to divide the various macroblock groups into different categories. For example, the mean macroblock residual/SAD value or the mean macroblock energy may be used.

To provide an illustration of different quantization categories, one implementation using mean SAD values is hereby presented. First, the various different mean SAD values $m_0$ to $m_6$ for each macroblock groups are plotted on line. Then an average of the macroblock group SAD values is calculated as follows:

$$m_{AVG} = \frac{1}{7} \sum_{i=0}^{6} m_i$$

Figure 3:
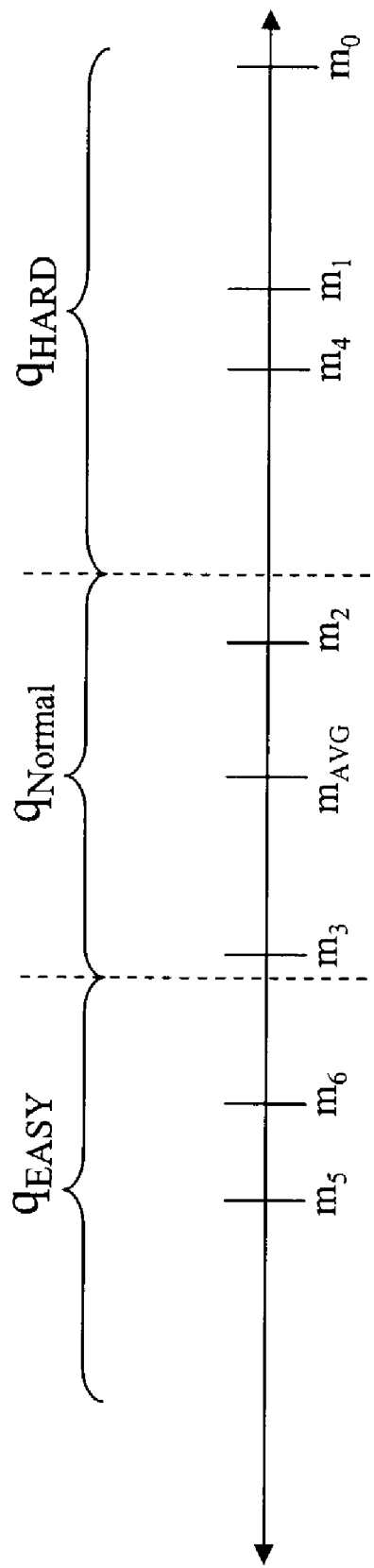
FIG. 3 illustrates a one dimensional line graph with a set of quantization categories centered on an average of the macroblock group SAD values.

The macroblock group SAD values and the overall macroblock group average are plotted on the same line as illustrated in FIG. 3. Finally, a set of quantization categories are then centered about the $m_{AVG}$ value, the average of the macroblock group SAD values.

In the example embodiment of FIG. 3, there are only three different quantization categories ($q_{Easy}$, $q_{Normal}$, and $q_{Hard}$). Thus, as illustrated in FIG. 3, $q_{Normal}$ is centered on the $m_{AVG}$ value, $q_{Easy}$, lies to the left of it for handling this simple macroblock groups with small SAD values, and $q_{Hard}$ lies to the right for handling complex macroblock groups with high SAD values. Although FIG. 3 illustrates an example with only three quantization categories, there could be many more quantization categories. Similarly, the quantization categorization may be performed with macroblock group energy values or any other macroblock group measurement.

Advanced Macroblock Groups for Quantization

Figure 2C:
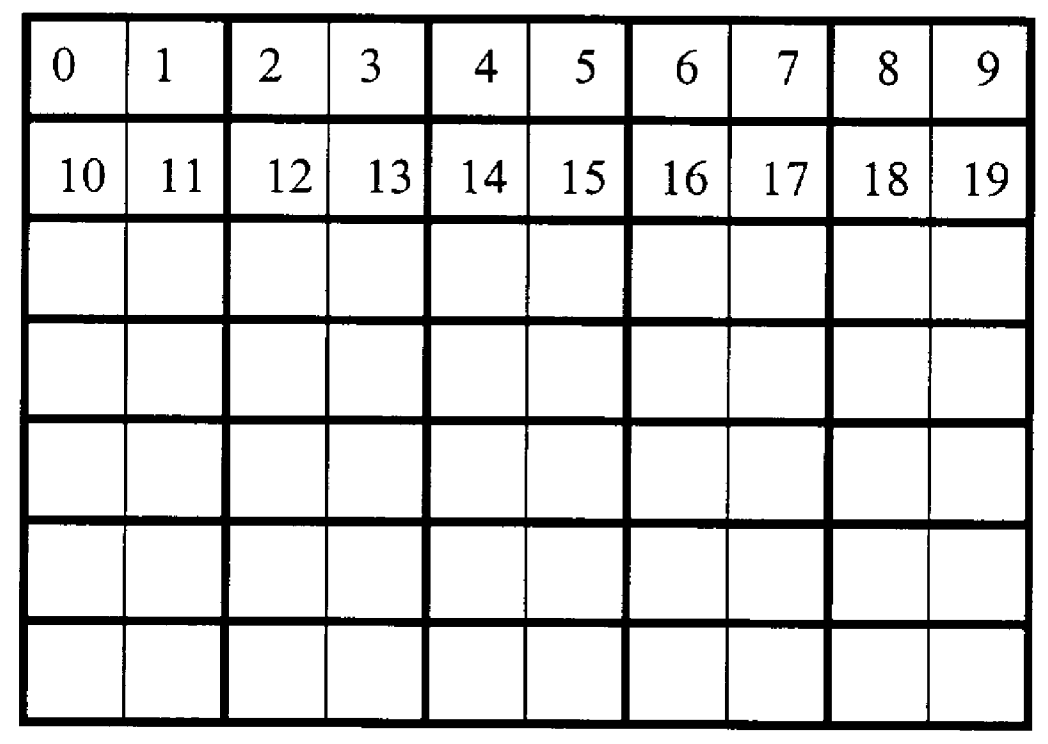

In a more advance embodiment of the present invention, the quantizer may dynamically create different sized macroblock groups. For example, FIG. 2c illustrates an embodiment wherein the macroblocks are placed into macroblock groups of two macroblocks each. In MPEG-4 implementations for thin-client systems, the macroblocks in a macroblock group should be adjacent to each other since the quantizer changes on a relative basis. In other digital video encoding systems, the grouped macroblocks do not need to be adjacent to one another.

A number of different factors may be considered in determining the macroblock group sizes and the macroblock groupings. Different embodiments may take in consideration different factors.

One factor that may be considered is the capabilities of the computer system being used to run the video encoder system. The quantizer may first determine the amount of CPU processing power available before determining the size of the macroblock groups. The CPU processing power includes a processor speed, an amount of available memory, a cache memory speed, cache memory size, and other characteristics that affect computer performance. In this manner, the quantizer may select an optimal macroblock group size for the particular computer system being used.

In conjunction with the processing power of the computer system, the size of the video frame should be used to determine the macroblock grouping. The size of the video frame determines the number of macroblocks in the video frame, and therefore is another factor that determines how much processing is required to encode each video frame. The reason the number of macroblock groups matter is that the digital video encoder can not be allowed to exceed its allocated time for encoding one video frame. As a result, the size of macroblock groups depends on both the available computational resources and the requirement of being able to encode the video frame within the allowed time.

In other embodiments, the type of video sequence may help determine the macroblock group size. Specifically, the characteristics of the individual macroblocks may be used to determine the macroblock group size. The method of macroblock encoding used can help in determine macroblock groupings. For example, it may be beneficial to group together macroblocks that are encoded in the same manner. Similarly, it may be beneficial to group together the same types of macroblocks (intra-blocks or inter-blocks). The history of motion vectors may be used to group together macroblocks. Thus, it may be efficient to group together macroblocks that are experiencing the same type of motion. The amount of 'residual' from macroblocks may also be used in determine macroblock groupings. The residual is the amount of difference between an inter-block macroblock and the macroblock that is referred to by the inter-block's motion vector. If there is a large amount of residual to encode, this means that the digital video encoder did not find a motion vector to a closely matching macroblock. Thus, macroblocks with similarly large (or small) residuals may be grouped together for efficiency. Finally, 'energy' of a macroblock may be considered during macroblock grouping. The 'energy' is a measure of the frequency of the data. Grouping together macroblocks with similar energy values may be beneficial. Additional macroblock features may also be considered to improve the macroblock groupings.

Note that the quantizer in the digital video encoder may change the macroblock groupings dynamically. For example, if the digital video encoder determines some macroblocks in a macroblock group are very different from the rest of the macroblocks in a macroblock group, then the digital video encoder may further divide the existing macroblock group into two macroblock groups: one macroblock group for the different macroblocks and the other macroblock group containing the remaining macroblocks from the original macroblock group. Furthermore, if the characteristics of the video in the video stream change, then the macroblock groupings should be adjusted in view of the new characteristics.

Quantizer Assignment to a Macroblock Group

As set forth in the previous section, the selection of a quantizer for each macroblock group may be performed with reference to the sum of absolute difference (SAD) values of the macroblocks in the group. However, many other factors may also be taken into consideration since the macroblock quantization step is one of the final steps in the compression of a video frame such that a wealth of information is available. Other factors that may be considered when selecting a quantizer value (q) for macroblock groups include:

How the macroblocks are encoded—There are several different methods of encoding macroblock information. Since some of those encoding methods are more sensitive to quantization errors, the type of macroblock encoding should be considered.

Macroblock type—When the macroblock is an intra-block or an inter-block. In generally, an intra-block should receive a finer quantizer value for less compression since it is not referring to any additional outside information. Inter-blocks may be given a coarser quantization value since additional outside information is used.

Current Motion Vector—Macroblock groups having fast moving macroblocks (macroblocks having longer motion vectors) should be given a coarser quantizer value while macroblock groups having slow moving macroblocks (macroblocks with shorter motion vectors) should be given a finer quantizer value.

Motion Vector history—If some objects have been moving for the last couple of video frames then there is a high probability that there will be additional movement. Thus, since our eyes tend to focus on moving objects and the moving area will likely be referenced by other inter-frames, macroblocks having a recent history of motion should use a finer quantizer for less compression.

The amount of macroblock 'residual'—If the macroblocks in a macroblock group all have a large amount of residual to encode, then the digital video encoder was not able find motion vectors to closely matching macroblocks. Thus, a fine quantizer value should be used to improve the quality of the inter-macroblocks in a macroblock group having a high residual. Macroblock groups having a small residual may use a coarser quantizer.

The 'energy' of macroblocks—The 'energy' of a macroblock is a measure of the frequency of the data. A macroblock with high frequency data should be allocated more bits by reducing the quantization value. The digital video encoder may use this energy measure to estimate how much quantization noise a particular macroblock holds. A coarse quantizer value should be used if a macroblock is determined to have an ability to hold quantization noise (it has high energy). Being able to hold quantization noise means that the digital encoder may use a coarser quantizer value but the subject quality of the video remains the same. Conversely, a macroblock group contain macroblocks with a small amount of energy should be given a finer quantizer value.

Limiting the Quantizer Range

In the MPEG-4 video compression system, changes in the value of the macroblock quantizer (q) does not linearly affect the number of bits that will be assigned to the macroblock. Specifically, small changes at the low end of the quantizer scale will cause large changes in the number of bits allocated to the macroblock, but larger changes at the high end of the quantizer value scale tend to change the number of bits very little.

Figure 4:
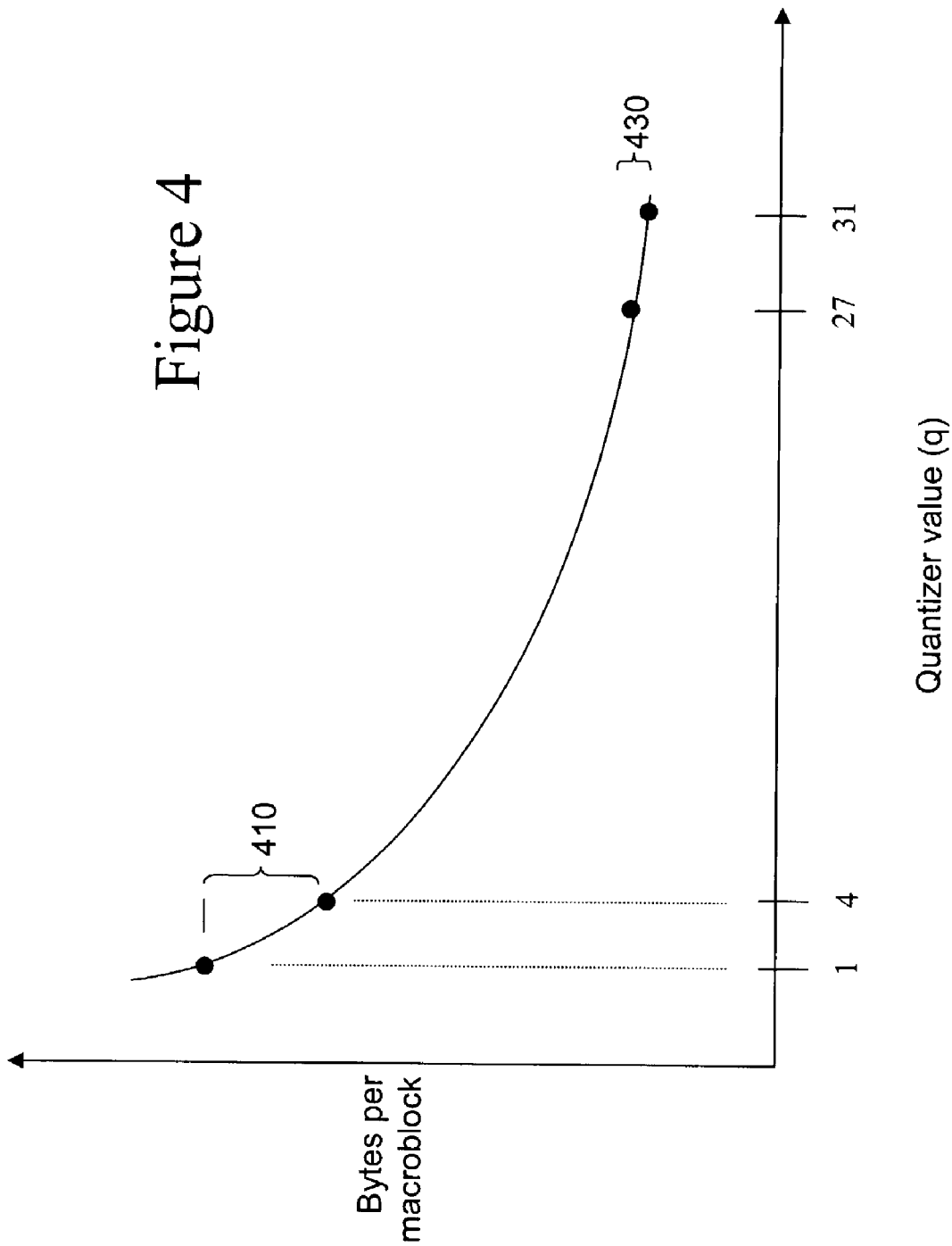
FIG. 4 illustrates graph that maps quantizer value to bytes per macroblock.

This non-linear sizing effect created by the quantizer value is illustrated in the graph of FIG. 4 wherein the quantizer value q is plotted against the corresponding number of bytes that will be allocated to the macroblock for that quantizer value q. As illustrated on the left portion of FIG. 4, the number of bytes allocated to macroblocks at the low end of the quantizer scale changes by a significant amount 410 as the quantizer value changes. Conversely, the number of bytes allocated to a macroblock changes by only a small amount 430 as the quantizer value changes near the high end of the quantizer scale.

In one embodiment of the present invention, the quantizer takes advantage of this peculiarity by only changing the quantizer value (q) by small increments when the quantizer is at the low end of the quantizer scale. Similarly, the quantizer makes larger changes in the quantizer at the high end of the quantizer scale.

Note that FIG. 4 is specific to an MPEG-4 compression system. Other quantizers may exhibit different behavior but the concept of limiting how the quantizer value is adjusted based upon the current value of quantizer may be used in many different digital compression systems.

Integrated Quantizer and Inverse Quantizer

Figure 5:
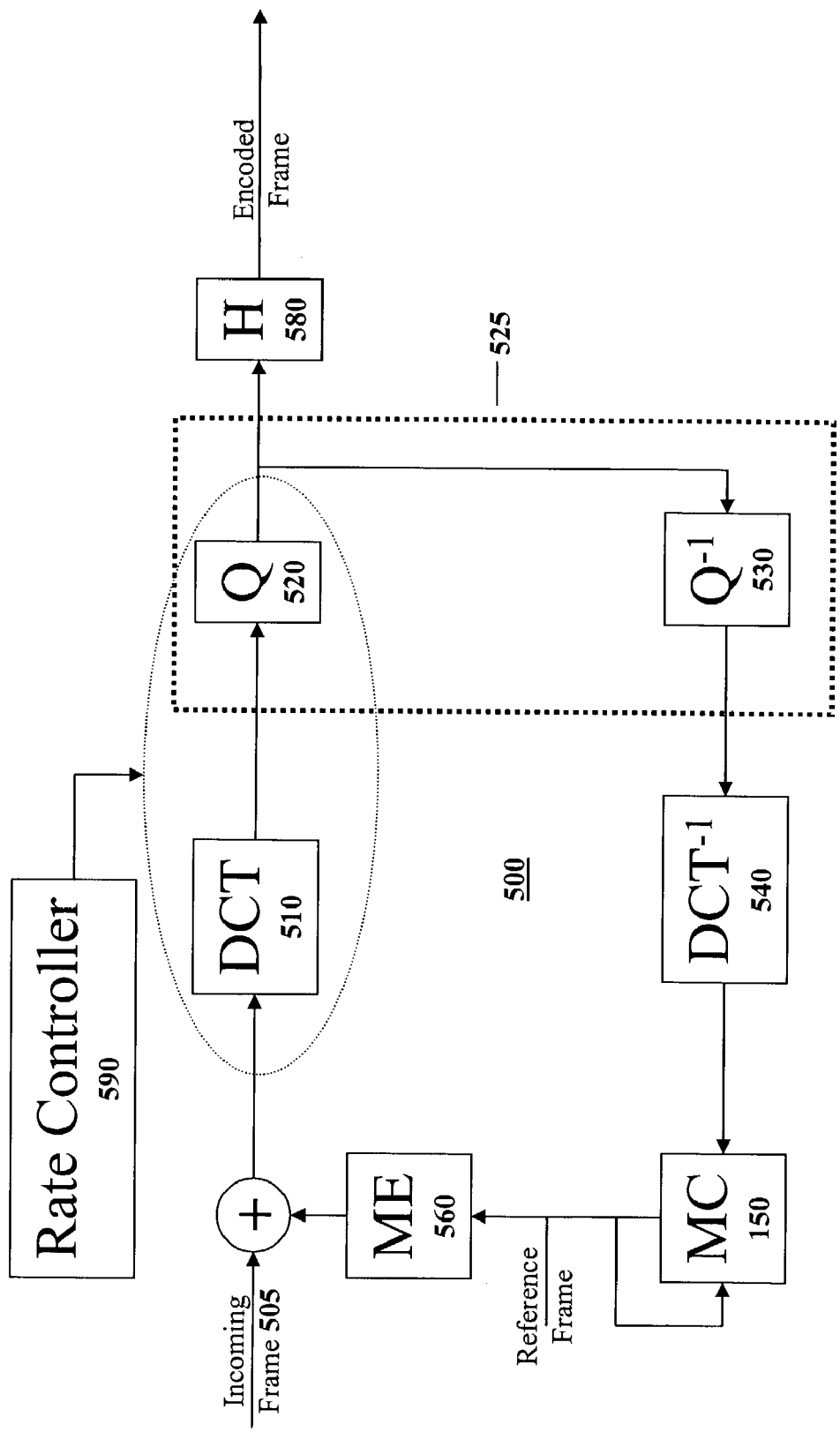
FIG. 5 illustrates a block diagram of a digital video encoder system with an integrated quantizer and inverse quantizer.

In one embodiment of the present invention, the video encoder is implemented with the quantizer and inverse quantizer integrated into a single unit. Specifically, FIG. 5 illustrates a block diagram of a digital video encoder wherein a Quantizer unit (Q) 520 has been implemented in the same single unit 525 as an Inverse Quantizer unit ($Q^{-1}$) 530.

The integration of both the Quantizer unit (Q) 520 and the Inverse Quantizer unit ($Q^{-1}$) 530 into a single unit has allowed for very efficient operation of both the Quantizer unit (Q) 520 and the Inverse Quantizer unit ($Q^{-1}$) 530. The highly efficient operation is obtained since the data required for the operation of Inverse Quantizer unit ($Q^{-1}$) 530 remains in the L1 or L2 cache of the processor from the earlier processing by the Quantizer unit (Q) 520.

In a preferred embodiment, the Quantizer unit (Q) 520 and the Inverse Quantizer unit ($Q^{-1}$) 530 are so tightly integrated that information needed for the inverse quantization remains in a processor register from the earlier quantization. In this manner, the inverse quantization is extremely efficient since it does not have to access external memory. In a preferred implementation, the combined Quantizer and Inverse Quantizer unit performs only one computation of the absolute value instead of two separate computations, only one computation of the sign of the value instead of two separate computations, and only one load from memory instead of two separate loads. These changes result in a significant performance gain is in the vector implementation where the removal just one computer instruction provides a greater impact on total instruction count than in the scalar implementation.

The following pseudo-code examples illustrate how an integrated Quantizer and Inverse Quantizer system implemented according to the teachings of the present invention differs from prior art implementations. In a standard prior art approach, the Quantizer and Inverse Quantizer are implemented separately:

```
//Quantize
For each row
{
vecRegister1<—vecLoadOneRow(memoryLocation1
    [row]);
vecRegister2<—vecComputeSign(vecRegister1);
vecRegister1<—vecComputeAbsValue(vecRegister1);
vecRegister1<—vecQuantize(vecRegister1);
vecRegister1<—vecMultiplyTheSignBackIn(vecRegis-
    ter1, vecRegister2);
memLocation2[row]<—vecStore(vecRegister1);
}
//Additional processing happens in between that does
//not affect memLocation2, but may cause memLocation2 to
//be moved out of processor proximity (register or cache).
//Inverse Quantize
For each row
{
vecRegister1<—vecLoadOneRow(memLocation2[row]);
vecRegister2<—vecComputeSign(vecRegister1);
vecRegister1<—vecComputeAbsValue(vecRegister1);
vecRegister1<—vecInverseQuantize(vecRegister1);
vecRegister1<—vecMultiplyTheSignBackIn(vecRegis-
    ter1, vecRegister2);
memLocation3[row]<—vecStore(vecRegister1);
}
```

As set forth in the preceding pseudocode, the inverse quantizer stores a value into memory that must be later reloaded by the inverse quantizers. The following pseudo-code illustrates an example implementation of an integrated Quantizer and Inverse Quantizer system according to the teachings of the present invention.

```
//Integrated Quantize and Inverse Quantize
For each row
{
vecRegister1<—vecLoadOneRow(row);
vecRegister2<—vecComputeSign(vecRegister1);
vecRegister1<—vecComputeAbsValue(vecRegister1);
vecRegister1<—vecQuantize(vecRegister1);
//Begin the inverse quantization while value in register
vecRegister3<—vecInverseQuantize(vecRegister1);
//Complete the Quantization
vecRegister1<—vecMultiplyTheSignBackIn(vecRegis-
    ter1, vecRegister2);
//Complete the Inverse Quantization
vecRegister3<—vecMultiplyTheSignBackIn(vecRegis-
    ter3, vecRegister2);
memLocation1[row]<—vecStore (vecRegister1);
memLocation2[row]<—vecStore(vecRegister3);
}
```

In the preceding pseudocode of the present invention, the inverse quantizer begins the inverse quantization while needed information still resides in processor registers. Thus, the integrated quantizer and inverse quantizer of the present invention presented in the preceding pseudocode provides a great performance enhancement over the prior art digital video encoder systems with a separated quantizer and inverse quantizer.

The foregoing has described a system for performing quantization in a multimedia compression and encoding system. It is contemplated that changes and modifications may be made by one of ordinary skill in the art, to the materials and arrangements of elements of the present invention without departing from the scope of the invention.

We claim:

1. A method of quantizing a digital video frame comprising a plurality of macroblocks, wherein quantization of a macroblock comprises compressing values in the macroblock by using a single quantization value, said method comprising:
   dividing the video frame into more than one macroblock group, each of said macroblock groups comprising one or more macroblocks, at least one of said macroblock groups comprising more than one macroblock; and
   for each macroblock group, assigning a same single quantizer value to all macroblocks in the macroblock group, wherein said single quantizer value for the macroblock group is dependent upon how macroblocks in said macroblock group are encoded; and
   for each macroblock group, quantizing the macroblocks in the macroblock group by using the same single assigned quantizer value as the single quantization value for each macroblock in the macroblock group.

2. The method of claim 1, wherein the macroblocks in each macroblock group are adjacent.

3. The method of claim 1, wherein a number of macroblocks in each macroblock group is dependent on a processor speed of a computer performing the quantization.

4. The method of claim 1, wherein a number of macroblocks in each macroblock group is dependent on a memory size of a computer performing the quantization.

5. The method of claim 1, wherein a number of macroblocks in each macroblock group is dependent on a cache memory speed of a computer performing the quantization.

6. The method of claim 1, wherein a number of macroblocks in each macroblock group is dependent on a frame size of said video frame.

7. The method of claim 1, wherein dividing the video frame into more than one macroblock group comprises determining a quality measure for each macroblock group.

8. The method of claim 7, wherein determining the quality measure for each macroblock group comprises:
   determining a sum of absolute differences value for each macroblock in said set of macroblocks that comprise said video frame; and
   determining an average sum of absolute differences value for each macroblock group.

9. The method of claim 7, wherein said single quantizer value for a particular macroblock group is further dependent upon said quality measure for said particular macroblock group.

10. The method of claim 7 further comprising:
    assigning each macroblock group into one of a plurality of quantization categories according to the quality measure of the macroblock group; and
    assigning a discrete quantization value to each macroblock group in a particular quantization category.

11. The method of claim 10, wherein said plurality of quantization categories are centered about an overall average quality measure for macroblocks in said video frame.

12. The method of claim 10, wherein said quality measure for a particular macroblock group comprises an average sum of all differences for macroblocks in said particular macroblock group.

13. The method of claim 1, wherein said single quantizer value for a particular macroblock group is further dependent upon whether said particular macroblock group contains only intra-blocks, only inter-blocks, or both intra-blocks and inter-blocks.

14. The method of claim 1, wherein said single quantizer value for a particular macroblock group is further dependent upon a history of motion vectors associated with macroblocks in said particular macroblock group.

15. The method of claim 14, wherein said single quantizer value for the particular macroblock group is given a fine quantizer value when said history of motion vectors associated with macroblocks in said particular macroblock group indicates a history of slow or no motion.

16. The method of claim 14, wherein said single quantizer value for the particular macroblock group is given a coarse quantizer value when said history of motion vectors associated with macroblocks indicates a history of fast motion.

17. The method of claim 1, wherein said single quantizer value for a particular macroblock group is further dependent upon current motion vectors associated with macroblocks in said particular macroblock group.

18. The method of claim 1, wherein said single quantizer value for a particular macroblock group is further dependent upon residual values for macroblocks in said particular macroblock group.

19. The method of claim 1, wherein said single quantizer value for a particular macroblock group is further dependent upon energy values for macroblocks in said particular macroblock group.

20. The method of claim 19 wherein said energy values for macroblocks in said particular macroblock group comprise frequency content of the macroblocks in said particular macroblock group.

21. The method of claim 1 further comprising:
    adjusting a quantizer value for a first particular group of macroblocks by small amounts when said quantizer value is near a low end of a quantizer value scale; and
    adjusting a quantizer value for a second particular group of macroblocks by large amounts when said quantizer value is near a high end of a quantizer value scale.

22. A method of quantizing a sequence of video frames comprising first and second video frames, each frame in the sequence comprising a plurality of macroblocks, wherein quantization of a macroblock comprises compressing values in the macroblock by using a single quantization value, said method comprising:
    dividing the first video frame into a first set of macroblock groups, each macroblock group in said first set of macroblock groups comprising one or more macroblocks, at least one of said macroblock groups comprising more than one macroblock;
    for each macroblock group in said first set of macroblock groups, assigning a same single quantizer value to all macroblocks in the macroblock group;
    for each macroblock group in said first set of macroblock groups, quantizing the macroblocks in the macroblock group by using the same single assigned quantizer value as the single quantization value for each macroblock in the macroblock group;
    dividing the second video frame into a second set of macroblock groups, each macroblock group in said second set of macroblock groups comprising one or more macroblocks, at least one of said macroblock groups comprising more than one macroblock, said second set of macroblock groups different in number from said first set of macroblock groups;
    for each macroblock group in said second set of macroblock groups, assigning a same single quantizer value to all macroblocks in the macroblock group; and
    for each macroblock group in said second set of macroblock groups, quantizing the macroblocks in the macroblock group by using the same single assigned quantizer value as the single quantization value for each macroblock in the macroblock group.

23. The method of claim 22, wherein the macroblocks in each macroblock group in each set of macroblocks are adjacent.

24. The method of claim 1, wherein the macroblocks in each macroblock group in each set of macroblocks have at least one similar statistic.

25. The method of claim 24, said method further comprising:
    before assigning the quantizer values, subdividing a particular macroblock group into two macroblock groups when at least one macroblock in said particular macroblock group has a statistic that differs from other macroblocks in said particular macroblock group.

26. The method of claim 24, wherein said similar statistic comprises a macroblock energy.

27. The method of claim 24, wherein said similar statistic comprises a macroblock residual.

28. The method of claim 24, wherein said similar statistic comprises a current motion vector.

29. The method of claim 24, wherein said similar statistic comprises a motion vector history.

30. The method of claim 24 wherein said similar statistic comprises a macroblock encoding method.

31. The method of claim 24 wherein said similar statistic comprises a macroblock type.

32. A method of encoding a video picture comprising a plurality of pixel sets, each pixel set comprising a plurality of pixels, the method comprising:
    grouping the plurality of pixel sets into one or more groups, each of said groups comprising one or more pixel sets, at least one of said groups comprising more than one pixel set, wherein a number of said pixel sets in each group is based on resources of a computer performing the encoding;

for each group of pixel sets, assigning a same single quantizer value to all pixel sets in the group; and for each group of pixel sets, quantizing the pixel sets in the group by using the same single assigned quantizer value for each pixel set in the group.

33. The method of claim 32, wherein each of said resources is one of a processor speed, a memory size, and a cache memory speed.

34. The method of claim 32, wherein said pixel sets are macroblocks of said video picture.

35. A method of encoding a plurality of video pictures in a sequence of video pictures, each video picture comprising a plurality of pixel sets, each pixel set comprising a plurality of pixels, the method comprising:

for each video picture, grouping the plurality of pixel sets into one or more groups, each of said groups comprising one or more pixel sets, at least one of said groups comprising more than one pixel set, wherein a number of said pixel sets in each group is dynamically changed for at least one video picture during the encoding of said video sequence;

for each group of pixel sets, assigning a same single quantizer value to all pixel sets in the group; and for each group of pixel sets, quantizing the pixel sets in the group by using the same single assigned quantizer for each pixel set in the group.

36. The method of claim 35, wherein the number of pixel sets in a particular group is based on a history of motion vectors associated with pixel sets in said particular group.

37. The method of claim 35, wherein the number of pixel sets in a particular group is based on current motion vectors associated with pixel sets in said particular group.

38. The method of claim 35, wherein the number of pixel sets in a particular group is based on an amount of encoding residual from the pixel sets in said particular group.

39. The method of claim 35, wherein the number of pixel sets in a particular group is based on an energy of pixel sets in the particular group, wherein the energy of a particular pixel set is a measure of a frequency of data in the particular pixel set.

40. The method of claim 35, wherein said pixel sets are macroblocks of said video picture.

41. A method of encoding a video picture comprising a plurality of pixel sets, each pixel set comprising a plurality of pixels, the method comprising:

grouping the plurality of pixel sets into one or more groups, each of said groups comprising one or more pixel sets, at least one of said groups comprising more than one pixel set;

for each particular group of pixel sets, assigning a same single quantizer value to all pixel sets in the particular group based at least on an amount of residual to encode each pixel set in said particular group; and for each particular group of pixel sets, quantizing the pixel sets in the group by using the same single assigned quantizer value for each pixel set in the particular group.

42. The method of claim 41 further comprising:

adjusting said quantizer value for a first particular group by small amounts when said quantizer value is near a low end of a quantizer value scale; and adjusting said quantizer value for a second particular group by large amounts when said quantizer value is near a high end of a quantizer value scale.

43. A computer readable medium storing a computer program for execution by a processor, the computer program for encoding a video picture comprising a plurality of pixel sets, wherein each pixel set comprises a plurality of pixels, the computer program comprising sets of instructions for:

grouping the plurality of pixel sets into one or more groups, each of said groups comprising one or more pixel sets, at least one of said groups comprising more than one pixel set;

assigning, for each particular group of pixel sets, assigning a same single quantizer value to all pixel sets in the particular group based at least on a motion vector history of pixel sets in said particular group; and quantizing, for each particular group of pixel sets, the pixel sets in the group by using the same single assigned quantizer value for each pixel set in the particular group.

44. The computer readable medium of claim 43, wherein said pixel sets are macroblocks of said video picture.

45. A computer readable medium storing a computer program for execution by a processor, the computer program for encoding a plurality of video pictures in a sequence of video pictures, each video picture comprising a plurality of pixel sets, each pixel set comprising a plurality of pixels, the computer program comprising sets of instructions for:

grouping, for each video picture, the plurality of pixel sets into one or more groups, each of said groups comprising one or more pixel sets, at least one of said groups comprising more than one pixel set, wherein a number of said pixel sets in each group is dynamically changed for at least one video picture during the encoding of said video sequence;

assigning, for each group of pixel sets, a same single quantizer value to all pixel sets in the group; and quantizing for each group of pixel sets, the pixel sets in the group by using the same single assigned quantizer value for each pixel set in the group.

46. The computer readable medium of claim 45, wherein the number of pixel sets in a particular group is based on a history of motion vectors associated with pixel sets in said particular group.

47. The computer readable medium of claim 45, wherein the number of pixel sets in a particular group is based on current motion vectors associated with pixel sets in said particular group.

48. The computer readable medium of claim 45, wherein the number of pixel sets in a particular group is based on an amount of encoding residual from the pixel sets in said particular group.

49. The computer readable medium of claim 45, wherein the number of said pixel sets in a particular group is based on energies of pixel sets in the particular group, wherein the energy of a particular pixel set is a measure of a frequency of data in the particular pixel set.

50. The computer readable medium of claim 45, wherein said pixel sets are macroblocks of said video picture.

51. A computer readable medium storing a computer program for execution by a processor, the computer program for encoding a video picture comprising a plurality of pixel sets, wherein each pixel set comprises a plurality of pixels, the computer program comprising sets of instructions for:

grouping the plurality of pixel sets into one or more groups, each of said groups comprising one or more pixel sets, at least one of said groups comprising more than one pixel set;

assigning, for each particular group of pixel sets, a same single quantizer value to all pixel sets in the particular group based at least on current motion vectors associated with the pixel sets in said particular group; and quantizing, for each particular group, the pixel sets in the particular group by using the same single assigned quantizer value for each pixel set in the particular group.

52. The computer readable medium of claim 51, wherein the computer program further comprises sets of instructions for:

adjusting, for each particular group, said quantizer value by small amounts when said quantizer value is near a low end of a quantizer value scale; and adjusting, for each particular group, said quantizer value by large amounts when said quantizer value is near a high end of a quantizer value scale.

* * * * *

UNITED STATES PATENT AND TRADEMARK OFFICE
CERTIFICATE OF CORRECTION

| | | |
|---|---|---|
| PATENT NO. | : 7,769,084 B1 | Page 1 of 1 |
| APPLICATION NO. | : 10/427843 | |
| DATED | : August 3, 2010 | |
| INVENTOR(S) | : Thomas Pun et al. | |

It is certified that error appears in the above-identified patent and that said Letters Patent is hereby corrected as shown below:

In column 3, line 53, delete "Cosine." and insert -- Cosine --, therefor.

In column 4, line 50, delete "mariner," and insert -- manner, --, therefor.

In column 14, line 10, in claim 43, after "sets," delete "assigning".

Signed and Sealed this
Twenty-second Day of November, 2011

David J. Kappos
*Director of the United States Patent and Trademark Office*